Oct. 6, 1925.

G. T. EBERMAN

RETAINING VALVE ANCHOR

Filed Dec. 30, 1924  2 Sheets-Sheet 1

1,556,431

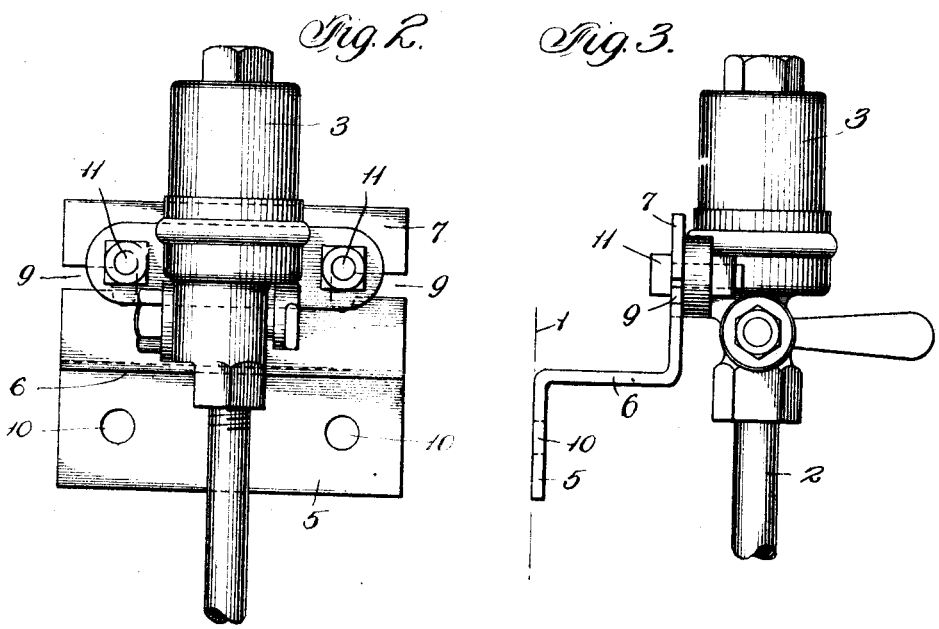
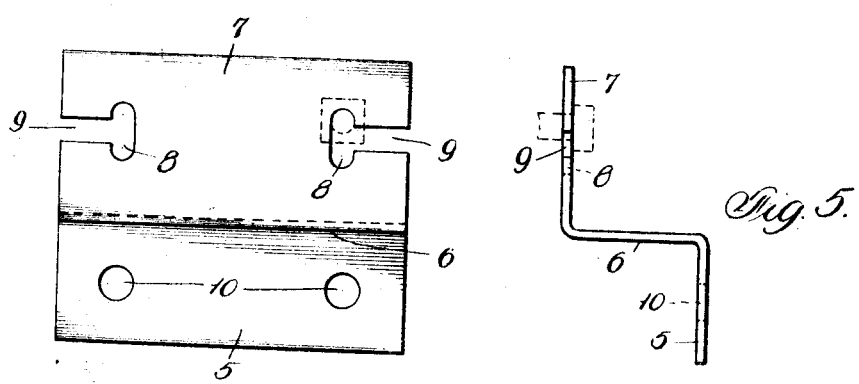

Patented Oct. 6, 1925.

1,556,431

UNITED STATES PATENT OFFICE.

GEORGE T. EBERMAN, OF MEADVILLE, PENNSYLVANIA, ASSIGNOR TO E. PAYSON SMITH, OF SPRINGFIELD, ILLINOIS.

RETAINING-VALVE ANCHOR.

Application filed December 30, 1924. Serial No. 758,962.

*To all whom it may concern:*

Be it known that I, GEORGE T. EBERMAN, a citizen of the United States, residing at Meadville, in the county of Crawford and State of Pennsylvania, have invented certain new and useful Improvements in Retaining-Valve Anchors, of which the following is a specification.

The retaining valve is a coordinate part of the air brake mechanism. It is just as important and necessary for the satisfactory operation of the air brake, as any part of the air brake mechanism. It is essential that the retaining valve properly function for the air brake to work to best advantage.

The function of the retaining valve is to retain a pressure of air in the air brake cylinder, while the air in the train line is being replenished from the locomotive. It is operated by trainmen for the purpose of controlling movement of train on grades of various degrees in hilly or mountainous localities.

The United States safety appliance laws require that brakes on railroad cars be at all times in good working order, for the safety of trains and the lives of trainmen. Where brakes are not effective, or, in good working order such a condition is a penalty defect, resulting in fines against the carrier by the Government.

Both lag screws and bolts are used as fastening members. The retaining valve is located on the outside end of the car and near the top of the car. On some type of freight cars of wooden end construction, the retaining valve is fastened to the car by the use of lag screws; on other cars of same type of construction, bolts are used. On cars of steel end construction, or steel end plate construction, bolts are used as fastening members. Such bolts extend from the inside of the car. The nuts on the ends of the bolts, being on the outside of the car.

The method of fastening retaining valves with lag screws to the cars is very unsatisfactory. Wood shrinks; the car vibrates and rocks under train and switching service conditions throwing a strain on these fastenings; these causes result in the lag screws becoming loosened and it is an impossibility to again tighten the lag screws in the same hole.

Bolts holding retaining valves attached to cars with a steel end construction, the holes through which such bolts pass must necessarily be slightly larger than the diameter of the bolts. Due to constant vibration of the car in train and switching service these bolt fastenings work loose, causing in time the holes to wear larger. Where these bolt fastenings for retaining valves are applied to open type steel cars, such as coal cars, the bolt holes often become enlarged to such an extent that it is impossible to bolt the valve securely to the car, until a steel plate is riveted thereon, having new openings for these bolt fastenings.

Where bolts work loose in steel end coal or closed type cars it is impossible to tighten the nuts, due to the bolt turning without holding a wrench on the head of the bolt on the inside of the car, which entails moving of load in case the car is loaded, entailing considerable expense, as well as delay of movement of car.

Where lag screws become loose in wooden type cars, and where bolt fastenings become loose in wooden type and in steel type cars, this looseness of fastening permits the retaining valve and connection to move back and forth with a pendulum like movement, which movement in time causes the pipe connection to break where it is screwed into the valve or at the union resulting in failure.

Retaining valves must be located on cars where they can be plainly seen by trainmen. It is the duty of trainmen to inspect retaining valves to see whether they are in an open or closed position. The present location does not always provide an easy inspection from the ground and if a retaining valve has been tampered with it cannot be readily seen. With this anchor retaining valves can be located at any point or place on the car. If, due to failure of trainmen to see retainer, a car is put in train service with the retainer in a closed position, then when the train has been put in motion and the brakes have been applied for purpose of control on grade, or, for purpose of lessening speed, and it is desired to again increase speed of train, the brakes on the car having the closed retaining valve will not release, resulting in damage to brake shoes and wheels, as well as draft gears.

When a retaining valve is applied to this anchor it is much more easy for the trainmen to operate the handle of the valve, as it stands away from the car. In the present method of application the handle lays up against the end of the car flush. If it is difficult for the trainman to insert his hand back of the handle, or, if the handle works hard, as is frequently the case, the trainman will not exert himself to operate the handle and will pass it by; this is not a satisfactory condition, as it makes for irregularity in the train control movement. The easier and more conveniently retaining valve handles can be operated, the quicker the train is brought under control and the less liable is the trainmen to injury for the reason that the trainman is holding to the brake wheel with one hand and with the other is turning up the retaining valve handle, during which time he is riding on the brake step, balancing himself during the operation.

The rules of the American Railway Association provide for a specific charge to be made by railroads, where the air brake cylinder, the triple valve, the centrifugal dirt collector and the retaining valve is cleaned on a foreign car, or, that is to say, on a car owned by another railroad. But, this charge provides that each of these four specifically mentioned parts of the air brake must be cleaned or the charge cannot be levied and collected. In other words, if three of these parts are cleaned and one of the parts is not cleaned, then no charge whatever can be made for the work. It will readily be seen how very expensive it will be if seals must be broken, cars entered and loads removed to take the retaining valve from the car for the purpose of cleaning. Where the valve is attached to the anchor, it can be removed and cleaned and replaced in a very few minutes.

In the drawings:

Figure 2 is a front elevation of my improved anchor with a retaining valve secured thereto.

Figure 3 is a side elevation of Figure 2.

Figure 4 is a front elevation of my improved anchor.

Figure 5 is a side elevation of Figure 4.

Figure 1:
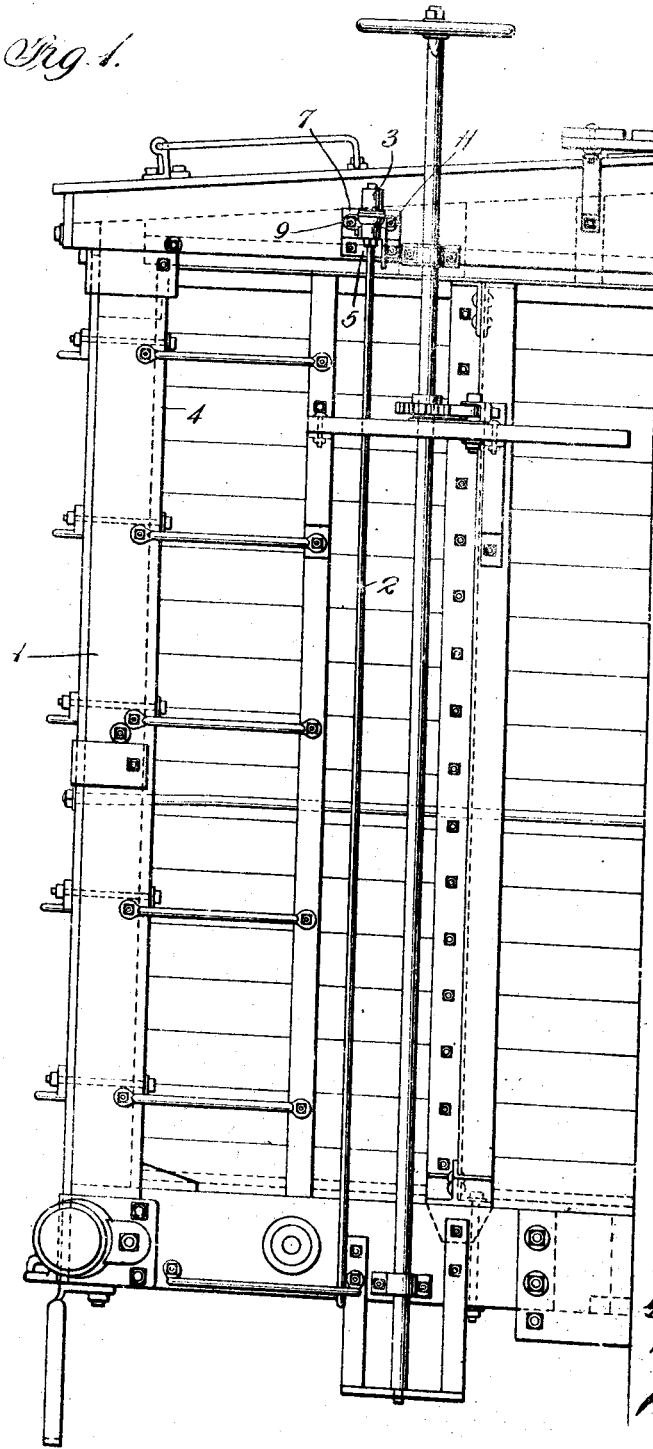
Figure 1 is an end elevation of a railroad car with my invention installed thereon, only one half of the car being shown.

The object of my invention is to provide an anchor for retaining valve so mounted on the car and of such construction that the retaining valve may be detached from the anchor without necessitating the removal of the load from the car thereby reducing the expense of repairs to a minimum and eliminating the possibility of damage, and loss of the commodity in the car.

The reference numeral 1 designates a car which may be of any type used by railroads. The pipe 2 leading from the air brake system of the car extends to a point near the top of the car on the upper end of which is secured the retaining valve 3 in convenient reach of the operation from the top of the car or while standing on the usual car ladder 4.

My improved anchor comprises a base 5, a spacing web 6, and a plate 7 extending, preferably, in an opposite direction from the web 6 as compared with the base 5, the base and plate being in parallel planes, but spaced from each other by the web 6, so that when the base 5 is secured to the end plate, or side plate, or other plate of a railroad car, the plate 7 is spaced from the car as clearly shown in the drawings. This plate is preferably bolted and riveted to wooden cars and riveted to steel cars.

The plate 7 is provided with bolt openings 8, preferably elongated, from which slots 9 extend to the side faces of the plate as best seen in Figure 4. 10 are bolt or rivet holes in the base.

My improved anchor, as above stated, is securely bolted and riveted to the car by rivets and bolts 15 passing through the openings 10. The dimension from the end of the car of the web 6 to the inside of the bracket may be made to suit the conditions, or to coincide with the wishes of the car-builder, or railroad. The bolts 11 which hold the retaining valve 3 to my improved anchor are put into the plate 7 from the side through the slots 9 and then moved to the elongated bolt openings 8.

In hanging this valve the operator will find it a great convenience to be able to loosely assemble one of the bolts 11 on the valve and with one hand push the valve toward its position sliding the bolt 11 into the slot 9 toward the slot 8 whereby the valve will be supported, thus leaving the operator free to use both hands in properly adjusting the valve to its final position after which bolts 11 are tightened and the valve firmly locked to the anchor.

It is often the case that service conditions result in the retainer pipe breaking loose at the threads where it enters the retaining valve, this being its weakest point. It is then necessary to replace the retainer pipe of the full length from the union to the valve, which is about 20 feet long on closed type of cars and about 15 feet long on open type cars. The adjustment provided by the elongated holes of the anchor will permit of the retaining valve being dropped or lowered down, to meet this retainer pipe. The retainer pipe can then be rethreaded and replaced in the retaining valve. This adjustment provided by the anchor permits of rethreading and replacing the pipe in the anchor a successive number of times. It is obviously more economical to rethread the retainer pipe, already on the car, than to replace with a new pipe.

Figures 1, 2 and 3 show the application of the retaining valve to the anchor. In using my improved anchor the cast iron retaining valve 3 is not subjected to any of the strains, which heretofore has caused the ears of the valve to be broken off. My anchor holds the valve rigid and perfectly perpendicular thus lending to efficient brake operation, and eliminates the trouble caused by a loose retaining valve which condition leaves the pipe and valve free to move similar to an inverted pendulum, which eventually breaks the pipe and the valve becomes inoperative, thereby causing a violation of the Federal safety appliance regulations.

It will be noted from Figure 3 that there is ample room between the car and the plate of the anchor within which to manipulate the bolts.

The anchor as a whole may be termed a Z shaped plate because there is on the market a commercially rolled plate of the same cross section which is known as Z shaped metal.

It is obvious that changes may be made in my invention without departing from the scope of the appended claims.

What I claim is:

1. The combination with a car and a retaining valve of a Z shaped bracket anchoring the valve to the car.

2. A retaining valve anchor comprising a base, a web, at right angles to the base, and a plate at right angles to the web, elongated bolt openings in the plate, and slots extending from said openings to the sides of the plate.

3. A retaining valve anchor comprising a base, a web extending outwardly at right angles to the base, an upwardly extending plate at the outer end of the web, vertically elongated bolt openings in the plate, and slots extending from said openings to the sides of the plate.

4. The combination with the wall of a car, of a retaining valve Z shape bracket, one arm of which is secured to said wall, the other arm being spaced from said wall, elongated bolt holes formed through said other arm, a retaining valve secured to said other arm by bolts passing through said elongated holes, which bolts are unattached to the car wall, said elongated holes permitting the bolts to be adjusted to accommodate varying lengths of the pipe connecting said valve with the air brake system of the car.

In testimony whereof I affix my signature.

GEORGE T. EBERMAN.